United States Patent
Braime (10) Patent No.: US 10,689,201 B1
(45) Date of Patent: Jun. 23, 2020

(54) MATERIAL CONVEYOR SYSTEM BUCKET COMPRISING A WEAR BAND AND METHOD FOR MAKING THE SAME

(71) Applicant: T.F. & J.H. BRAIME (HOLDINGS) P.L.C., Leeds (GB)

(72) Inventor: Nicholas Braime, Leeds (GB)

(73) Assignee: BRAIME GROUP PLC, Leeds (GB)

( * ) Notice: Subject to any disclaimer, the term of this patent is extended or adjusted under 35 U.S.C. 154(b) by 0 days.

(21) Appl. No.: 16/503,719

(22) Filed: Jul. 5, 2019

(51) Int. Cl.
*B65G 17/36* (2006.01)
*B65G 17/12* (2006.01)

(52) U.S. Cl.
CPC .......... *B65G 17/36* (2013.01); *B65G 17/126* (2013.01); *B65G 2207/02* (2013.01); *B65G 2207/48* (2013.01); *B65G 2812/02237* (2013.01); *B65G 2812/02742* (2013.01); *B65G 2812/02772* (2013.01)

(58) Field of Classification Search
CPC .. B65G 17/126; B65G 17/36; B65G 2207/02; B65G 2207/48; B65G 2812/02237; B65G 2812/02257; B65G 2812/02742; B65G 2812/02772; B65G 2814/0332
See application file for complete search history.

(56) References Cited

U.S. PATENT DOCUMENTS

| | | | | |
|---|---|---|---|---|
| 2,545,377 A | * | 3/1951 | Parisi | B65G 15/44 198/705 |
| 4,688,669 A | * | 8/1987 | Wobick | B65G 17/36 198/712 |
| 5,336,417 A | * | 8/1994 | Hannum | B01D 21/18 198/713 |
| 6,997,306 B2 | * | 2/2006 | Sofranec | B65G 17/08 198/779 |
| 7,097,027 B1 | * | 8/2006 | Chen | B65G 17/36 198/703 |
| 7,698,839 B1 | * | 4/2010 | Phillips | E02F 9/2883 198/713 |
| 9,278,468 B2 | * | 3/2016 | Wheat | B29C 45/2673 |
| 9,371,191 B2 | * | 6/2016 | Taylor | B29C 45/0055 |

* cited by examiner

*Primary Examiner* — Gene O Crawford
*Assistant Examiner* — Keith R Campbell
(74) *Attorney, Agent, or Firm* — Jeanette M. Braun

(57) ABSTRACT

A material conveyor system container and method of making same. The container comprises a wear band generally disposed at the points of contact of the bucket with the material being conveyed by the bucket that is made from a highly abrasion resistant material and the rest of the bucket is made from a less expensive polymer, such as polyethylene.

19 Claims, 6 Drawing Sheets

MATERIAL CONVEYOR SYSTEM BUCKET COMPRISING A WEAR BAND AND METHOD FOR MAKING THE SAME

BACKGROUND

In the art of elevator-type material conveyor systems, containers or so-called "buckets" are supported spaced-apart on an endless belt or chain for moving particulate material substantially vertically at least between a first elevation and a second higher elevation. A common application for elevator-type conveyor systems and the buckets associated therewith is for grain elevators as well as other applications wherein granular or particulate solid materials or material mixtures are conveyed by loading the buckets with conveyance material as the buckets move along the path of the endless belt or chain support structure. As the buckets go over the top of the conveyor, they tip over and empty, ready for more material on their way up again.

Material can fill the bucket by moving along a conveyor belt, falling off the end of the conveyor belt and into the bucket through an opening, typically located in the top of the bucket. The material that fills the bucket is abrasive and wears away the front edge lip and a forward portion of side walls of the bucket as it falls from the conveyor belt into the bucket. Also, not all material that falls off the conveyor belt is captured by the bucket. The buckets can be positioned to pick up the materials sitting on the ground that did not fall into the bucket. The materials scrape against the front edge lip and a forward portion of side walls of the bucket as the bucket picks them up from the ground and wear away the portion of the bucket that contacts the materials.

The buckets can be made from many types of materials, and material selection is typically based on cost, environmental factors, and the particular type of material being conveyed by the bucket. Elevator buckets are made of one material, and the material typically comprises polymers such as polyethylene, particularly high-density polyethylene (HDPE), polyurethane, and nylon.

A longstanding problem with elevator buckets relates to excessive wear on the front edge lip and a forward portion of side walls of the buckets incurred as the flow of material being conveyed filling the buckets while they pass along their path of movement. Premature failure of the front edge or lip can result in loss of bucket capacity which adversely affects material transport operations. Increasing material thickness uniformly throughout the bucket structure is disadvantageous from the standpoint of cost and the added tare weight of the buckets, for example. Buckets made from HDPE are cost effective but wear quickly. Buckets made from nylon or urethane polymer are very expensive but are much more abrasion resistant when compared to HPDE buckets and wear very slowly.

Accordingly, there has been a need to develop an elevator bucket which has an improved working life, is not subject to premature wear to the extent that the bucket will fail and will not likely undergo measurable, reduced capacity, while being only slightly more costly to produce than an elevator bucket made entirely of HDPE.

SUMMARY

The present disclosure provides an improved material handling bucket, particularly an elevator bucket used in elevator type conveyor systems.

In one embodiment of the present disclosure, an elevator bucket is provided that comprises a wear band portion generally disposed at the point where the material fills the bucket and comprises an abrasion resistant material, such as nylon, and the rest of the bucket is made from an inexpensive polymer, such as HDPE.

In another embodiment of the present disclosure, an elevator bucket is provided that comprises a wear band portion generally disposed at the point of receipt of the material being conveyed by the bucket that is made from an abrasion resistant material, such as nylon, and is permanently attached or integrated onto the front and partial forward side areas of the bucket, such as by using the process of overmolding or ultrasonic welding, which are made from an inexpensive polymer, such as HDPE.

In another embodiment of the present disclosure, an elevator bucket is provided that comprises a wear band portion generally disposed at the point of receipt of the material being conveyed by the bucket that is made from an abrasion resistant material, such as nylon, and is removably attached onto the front and partial forward side areas of the bucket, which are made from an inexpensive polymer, such as HDPE. The wear band can me removably attached by using interlocking features, fasteners, or adhesive, and the wear band can be replaced by another wear band that removably attaches to the bucket.

In another embodiment of the present disclosure, an elevator bucket is provided that comprises a back wall, a bottom wall, opposed sidewalls, a front wall, and a wear band. The front wall is joined to the bottom wall forming an open top and the front wall is joined to the opposed sidewalls by arcuate corner parts. The wear band extends entirely across a top portion of the front wall and arcuate corner parts and extends across a portion of a top portion of the opposed sidewalls. The wear band can be made of a polymer, preferably a highly abrasion resistant material. The rest of the elevator bucket, meaning all of the components that are not the wear band, can be made of a polymer different than the polymer used for the wear band, preferably a thermoplastic polymer, such as polyethylene. The portion of the elevator bucket made of a polyethylene material comprises all of the components of the elevator bucket together, minus or without the wear band, and wherein the highly abrasion resistant material is attached to the polyethylene material.

In another embodiment of the present disclosure, the abrasion resistant material can be nylon plastic.

In another embodiment of the present disclosure, the polyethylene material can be a high density polyethylene plastic.

In another embodiment of the present disclosure, the abrasion resistant material is permanently attached to the polyethylene material through the overmolding process.

In another embodiment of the present disclosure, the abrasion resistant material is permanently attached to the polyethylene material through ultrasonic welding.

In another embodiment of the present disclosure, the abrasion resistant material is overmolded onto the polyethylene material through injection molding.

In another embodiment of the present disclosure, the highly abrasion resistant material can be overmolded or ultrasonically welded onto the polyethylene material to form a single homogenous elevator bucket.

In another embodiment of the present invention the abrasion resistant material is can be a different color than the polyethylene material.

In another embodiment of the present invention, the abrasion resistant material is removably attached to the polyethylene material.

In another embodiment of the present disclosure, the abrasion resistant material is removably attached to the polyethylene material using fasters, such as, but not limited to, bolts, screws, lags, rivets, anchors, or the like. One having ordinary skill in the art would understand what fastener could be used to removably attach the abrasion resistant material to the polyethylene material.

In another embodiment of the present disclosure, the abrasion resistant material is removably attached to the polyethylene material using an adhesive, such as, but not limited to, adhesives classified by their chemistry (epoxies, polyurethanes, polyimides), their form (e.g. paste, liquid, film, pellets, tape), their type (e.g. hot melt, reactive hot melt, thermosetting, pressure sensitive, contact, etc.), or their load carrying capability (structural, semi-structural, or non-structural). One having ordinary skill in the art would understand what adhesive could be used to removably attach the abrasion resistant material to the polyethylene material.

In another embodiment of the present disclosure, the abrasion resistant material is removably attached to the polyethylene material using interlocking features, such as a tongue and groove type system.

In another embodiment of the present disclosure, an elevator bucket is provided, comprising a single uniform body formed of two polymers comprising a back wall, a pair of opposed sidewalls, a bottom wall spaced from the front and side walls also being spaced apart and forming an upper opening can be made of a first polymer, and a wear band can be made of a second polymer. The wear band can extend entirely across a top portion of the front wall and/or arcuate corner parts and/or extend across at least a portion of the opposed sidewalls. The two polymers form a single uniform elevator bucket once the second polymer is overmolded or ultrasonically welded onto the first polymer.

In another embodiment of the present disclosure, the first polymer can be a thermoplastic polymer.

In another embodiment of the present disclosure, the thermoplastic polymer can be a high density polyethylene plastic.

In another embodiment of the present disclosure, the second polymer can be an abrasion resistant material.

In another embodiment of the present disclosure, the second polymer can be overmolded onto the first polymer to form a single homogenous elevator bucket.

In another embodiment of the present disclosure, the first polymer is a different color than the second polymer.

In another embodiment of the present disclosure, a method of manufacturing an elevator bucket is provided, comprising forming a first injection molded part comprising a portion of a back wall, a portion of opposed sidewalls; arcuate corner parts, and a portion of a front wall, wherein the front wall can be joined to the bottom wall and form an open top, and the first injection molded part can be made of a polyethylene material; forming a second injection molded part comprising a wear band, wherein the wear band comprises an abrasion resistant material, overmolding or ultrasonically welding the second injection molded part over the first injection molded part, wherein the second injection molded part extends across a top portion of the front wall and/or arcuate corner parts and/or extend across at least a portion of the opposed sidewalls.

Those skilled in the art will further appreciate the above-mentioned advantages and superior features of the invention together with other important aspects thereof up reading the detailed description which follows in conjunction with the drawings.

DESCRIPTION OF THE PREFERRED EMBODIMENTS

The following detailed embodiments presented herein are for illustrative purposes. That is, these detailed embodiments are intended to be exemplary of the present invention for the purposes of providing and aiding a person skilled in the pertinent art to readily understand how to make and use of the present invention.

Accordingly, the detailed discussion herein of one or more embodiments is not intended, nor is it to be construed, to limit the boundaries of the descriptions but rather as defined by the claims and equivalents thereof. Therefore, embodiments not specifically addressed herein, such as adaptations, variations, modifications, and equivalent arrangements, should be and are considered to be implicitly disclosed by the illustrative embodiments and claims set forth herein and therefore fall within the scope of the present invention.

Further, it should be understood that, although steps of various claimed methods may be shown and described as being in a sequence or temporal order, the steps of any such method are not limited to being carried out in any particular sequence or order, absent an indication otherwise. That is, the claimed method steps are considered capable of being carried out in any sequential combination or permutation order while still falling within the scope of the present invention.

Additionally, it is important to note that each term used herein refers to that which a person skilled in the relevant art would understand such term to mean, based on the contextual use of such term herein. To the extent that the meaning of a term used herein, as understood by the person skilled in the relevant art based on the contextual use of such term, differs in any way from any particular dictionary definition of such term, it is intended that the meaning of the term as understood by the person skilled in the relevant art should prevail.

Furthermore, a person skilled in the art of reading claimed inventions should understand that "a" and "an" each generally denotes "at least one," but does not exclude a plurality unless the contextual use dictates otherwise. Also, the term "or" denotes "at least one of the items," but does not exclude a plurality of items of the list.

In the description which follows, like parts are marked throughout the specification and drawings with the same reference numerals, respectively. The drawing figures may not necessarily be to scale and certain features may be shown in somewhat schematic form in the interest of clarity and conciseness.

Figure 1:
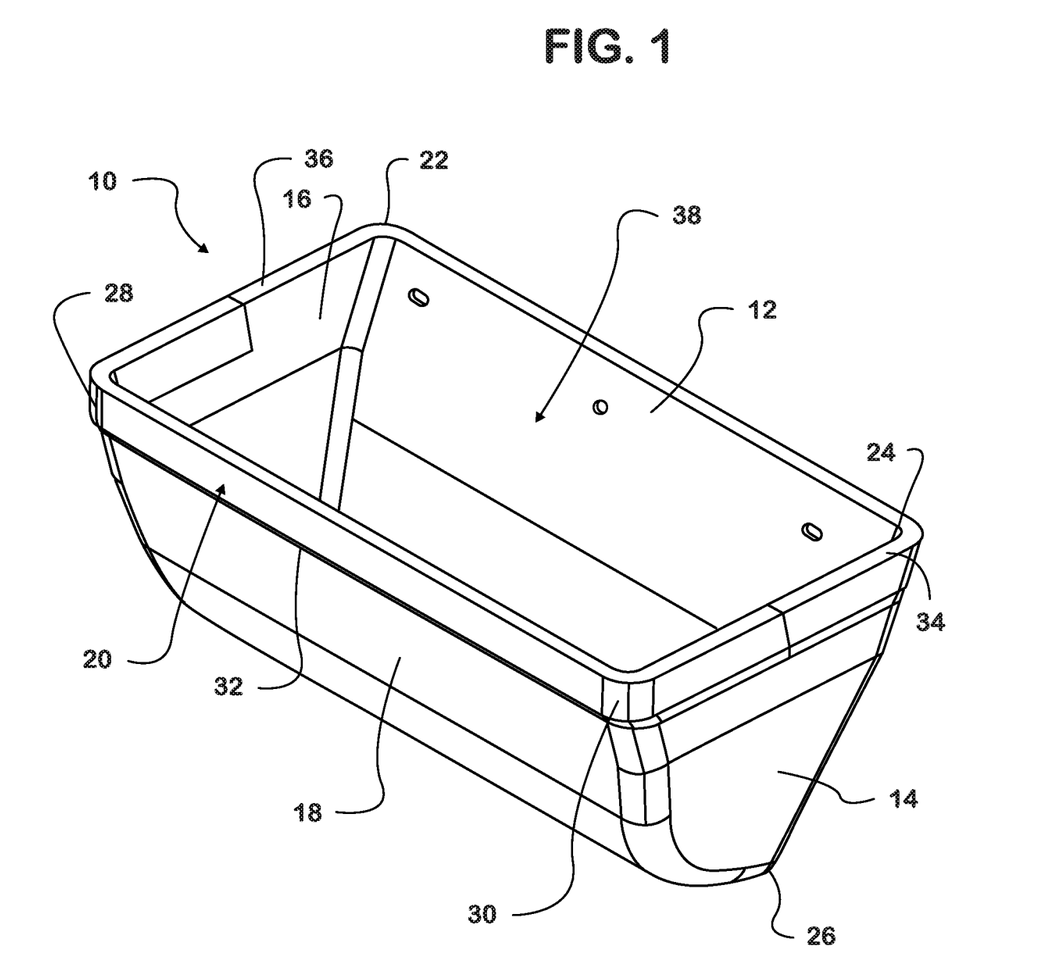
FIG. 1 illustrates a top perspective view of one embodiment of a material conveyor system container comprising a wear band.

Referring to FIG. 1, there is illustrated one embodiment of a material conveyor system container or an elevator bucket (these terms are used interchangeably) and generally designated by the numeral 10. The elevator bucket 10 is characterized by a back wall 12, opposed sidewalls 14 and 16 and a combined curvilinear bottom and front wall 18 delimited by a wear band 20. The back wall 12 and opposed sidewalls 14 and 16 are joined by arcuate corner parts 22 and 24, and the back wall 12 is joined to the combined bottom and front wall 18 by lower integral corner parts 26 and 27 (27 not shown) and the combined bottom and front wall 18 is joined to opposed sidewalls 14 and 16 by integral corner parts 28 and 30.

The wear band 20 comprises a lip 32 of the combined bottom and front wall 18, opposed sidewalls 14 and 16, and integral corner parts 28 and 30. The lip 32 extends the entire length of the lip 32 of the combined bottom and front wall 18 between integral corner parts 28 and 30, the entire length of the integral corner parts 28 and 30, and a contiguous portion of the opposed sidewalls 14 and 16. The wear band 20 can extend onto the opposed sidewalls 14 and 16 in any length that would protect a lip 32 of the opposed sidewalls 14 and 16 from wear during use of the elevator bucket 10. Opposed sidewalls 14 and 16 are delimited by top edges 34 and 36 which merge with depending arcuate corner parts 22 and 24, respectively, and join with the integral corner parts 28 and 30, respectively.

The wear band 20 can be overmolded onto the elevator bucket 10 to form an elevator bucket 10 that is either a single continuous bucket or the wear band 20 can be injection molded and combined with the rest of the bucket by other means known in the art. By "overmolding" is generally meant an injection molding process whereby one part is molded on top of another part. A previously molded first part is inserted in a mold cavity, and the second part is molded over the first in an injection molding process to effectively create the final integrated assembly.

Preferred methods for molding the overmolded articles include, but are not limited to, injection molding, casting, extruding, compression molding, sintering, machining, or combinations thereof, although in the preferred embodiment, Injection molding is preferred.

In one embodiment of the present disclosure, the elevator bucket 10 without the wear band 20 would be first injection molded part and the wear band 20 would be the second injection molded part. The wear band 20 would be molded over the elevator bucket 10, which would not comprise the wear band 20 until the wear band 20 is molded over it.

The wear band 20 can also be welded onto the elevator bucket 10 through, for instance, the process of ultrasonic welding.

The wear band 20 can be removably fixed or attached to the elevator bucket 10 by means known in the art of fastening or attaching two objects together, such as through interlocking features molded onto the inner channel in the wear band and the lip 32, such as a tongue and groove configuration, where the wear band comprises a protrusion and the lip 32 comprises a corresponding slot for the protrusion to lock into, or vice versa.

The angle of the lip 32 of the elevator bucket assists with the efficiency of the elevator material conveyor system (not shown). Lip 32 can control the start and stop of the centrifugal discharge of the granular material inside of the elevator bucket 10 as the elevator bucket 10 runs over a top pulley of the elevator material conveyor system (not shown). A point of discharge is set by distance of the lip 32 from the center line a pulley of the elevator material conveyor system, and combined with the belts speed and the angle of the front radius, determines the point at which the granular material starts to be discharged from the elevator bucket 10.

Figure 2:
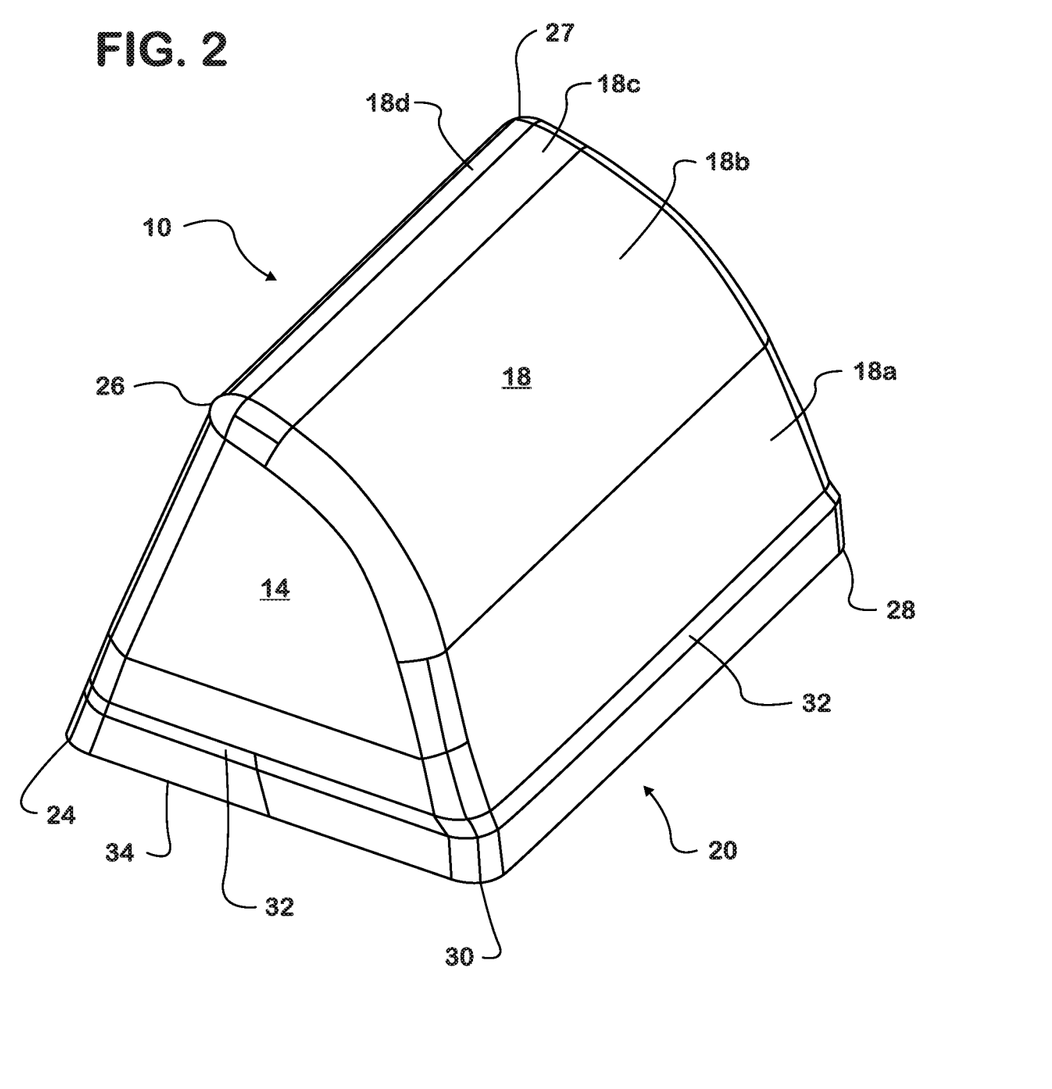
FIG. 2 illustrates a bottom perspective view of one embodiment of a material conveyor system container comprising a wear band.

Turning to FIG. 2, a bottom perspective view of one embodiment of an elevator bucket 10 is illustrated. The combined bottom and front wall 18, one opposed sidewall 14 (16 not shown), and one integral corner part 28 can be seen. The combined bottom and front wall 18 is preferably formed of integral wall segments including a wall segment 18a which is delimited by lip 32 and segments 18b, 18c and 18d, the last mentioned of which is joined to back wall 12 (not shown) by integral corner parts 26 and 27.

Figure 3:
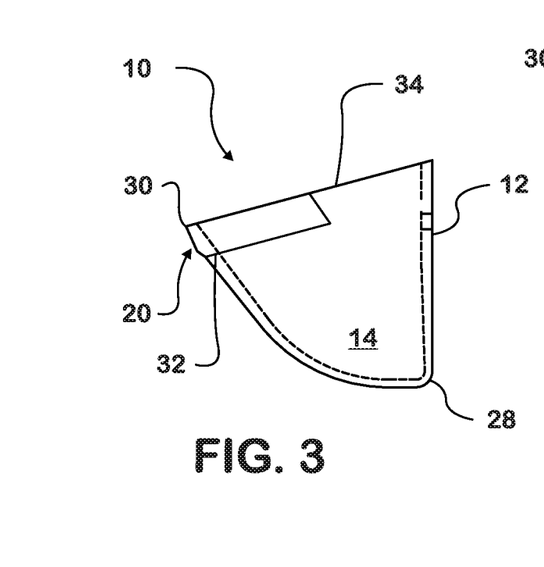
FIG. 3 illustrates a side plan view of one embodiment of a material conveyor system container comprising a wear band.

Turning to FIG. 3, a side plan view of one embodiment of a material conveyor system container or elevator bucket 10 is illustrated. Right and left side views would be mirror images of each other. Opposed sidewalls 14 and 16 (16 not shown) are substantially normal to the back wall 12 and are delimited by the top edges 34 and 36 (36 not shown), and join the wear band 20.

Figure 4:
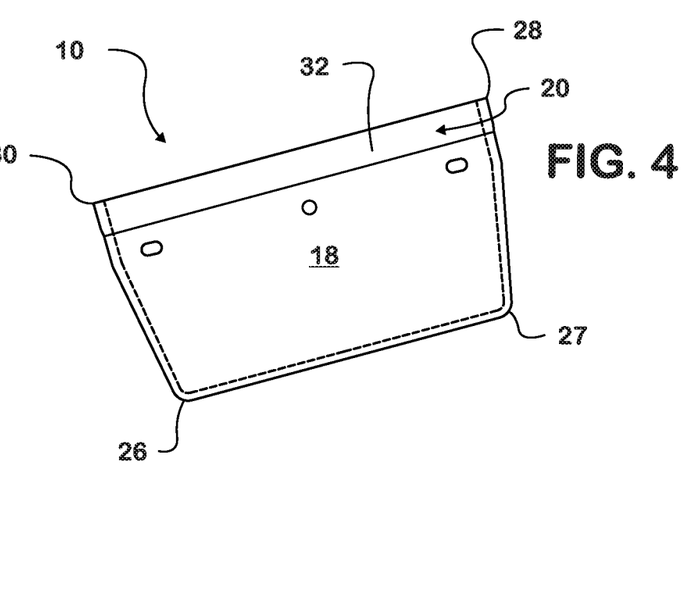
FIG. 4 illustrates a front plan view of one embodiment of a material conveyor system container comprising a wear band.

Turning to FIG. 4, a front plan view of one embodiment of a material conveyor system container or elevator bucket 10 is shown. The combined bottom and front wall 18 join to lip 32 and define a lower boundary of the wear band 20. The opposed sidewalls 14 (not shown) and 16 (not shown) are joined to the combined bottom and front wall 18 at lower integral corner parts 26 and 27 positioned at the bottom of the elevator bucket 10, and to the integral corner parts 28 and 30 positioned at the top of the elevator bucket 10.

Figure 5:
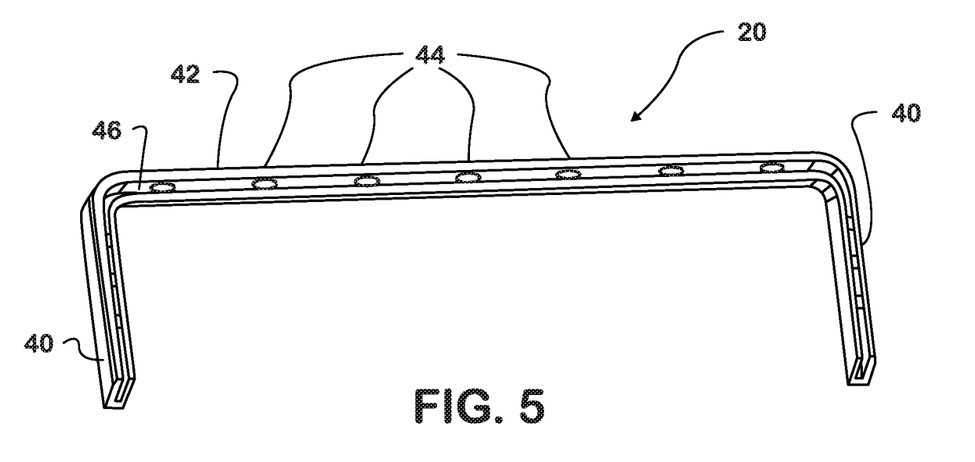
FIG. 5 illustrates a bottom perspective view of one embodiment of a wear band.

Turning to FIG. 5, one embodiment of the wear band 20 is illustrated in a bottom perspective view. The wear band 20 can comprise two sides 40, front 42, optional wear band through bores 44, and slot 46. The wear band 20 can be made as a single piece or it can be made in multiple pieces, and the pieces can be adhered together with fasteners, adhesives, frictional forces, tongue and groove system, or the like. The slot 46 can run the entire length of the wear band 20 and will accept lip 32 (see FIG. 6) when the wear band 20 is attached to the elevator bucket 10. The wear band 20 can be permanently attached to the elevator bucket 10, or it can be removably attached to the elevator bucket 10. A removably attached wear band 20 can be replaced if the abrasive granular material damages the wear band 20 as it passes over the wear band 20 when filling the elevator bucket 10 or when emptying it.

Figure 6:
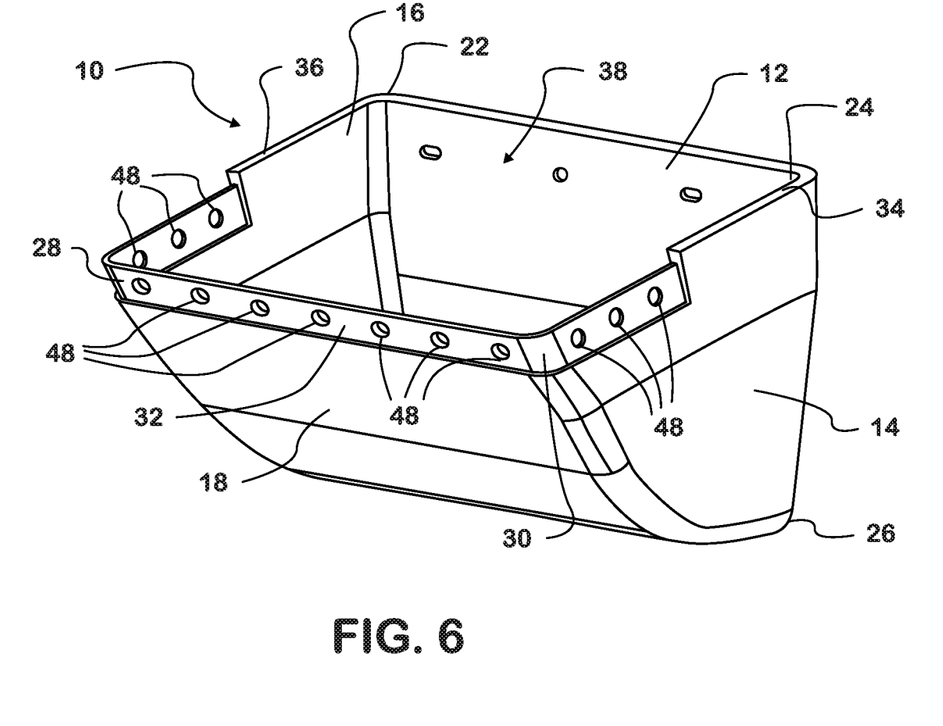
FIG. 6 illustrates a top perspective view of one embodiment of a material conveyor system container without a wear band comprising through holes for attaching a removable wear band with fasteners.

Turning to FIG. 6, one embodiment of the elevator bucket 10 is illustrated in a perspective view. The lip 32 of the elevator bucket 10 is exposed, and comprises optional lip through bores 48. When the wear band 20 is placed over the lip 32, the lip 32 enters the slot 46 (see FIG. 5) and the optional wear band through bores 44 (see FIG. 5) align with the optional lip through bores 48. If a fastener is used to removably attach the wear band 20 to the elevator bucket 10, the optional wear band through bores 44 and the optional lip through bores 48 accept the fastener.

Figure 7:
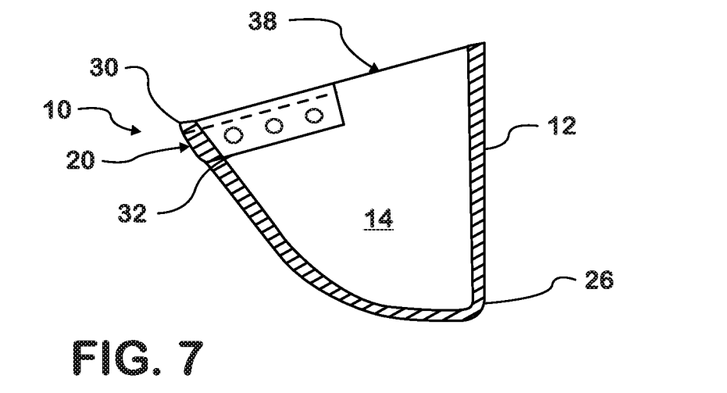
FIG. 7 illustrates a side plan view of the embodiment in FIG. 6.

Turning to FIG. 7, one embodiment of a material conveyor system container or elevator bucket 10 is illustrated in a side plan view. The wear band 20 is removably attached to the elevator bucket 10 with fasteners, though the wear band 20 can be permanently attached to the elevator bucket 10 without the need for fasteners, such as by overmolding or ultrasonically welding the wear band 20 onto the elevator bucket 10, or it can be removably attached by other means, such as, but not limited to, a tongue and groove system, an adhesive, or a combination thereof.

Figure 8:
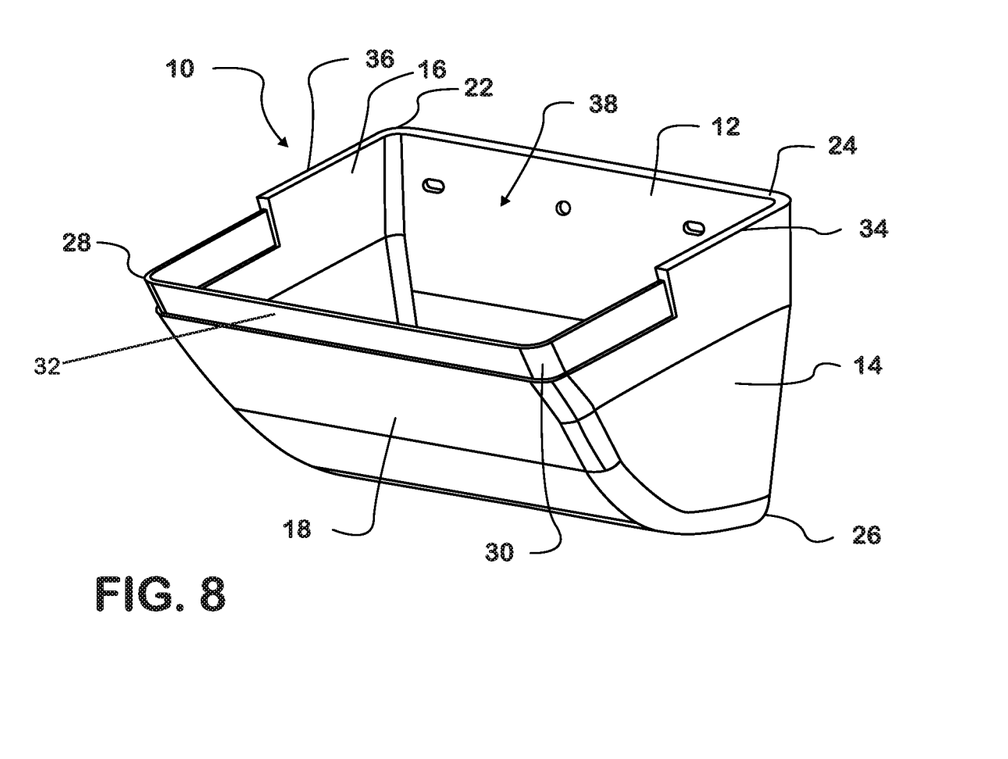
FIG. 8 illustrates a top perspective view of one embodiment of a material conveyor system container for attaching a removable wear band with adhesive.

Turning to FIG. 8, one embodiment of the elevator bucket 10 is illustrated in a perspective view for exemplary purposes. The lip 32 of the elevator bucket 10 is exposed, and does not comprise optional lip through bores 48. The wear band 20 is placed over the lip 32, the lip 32 enters the slot 46 (see FIG. 5) and can be removably attached to the lip 32 with a tongue and groove system, an adhesive, with frictional forces, or the like.

Figure 9:
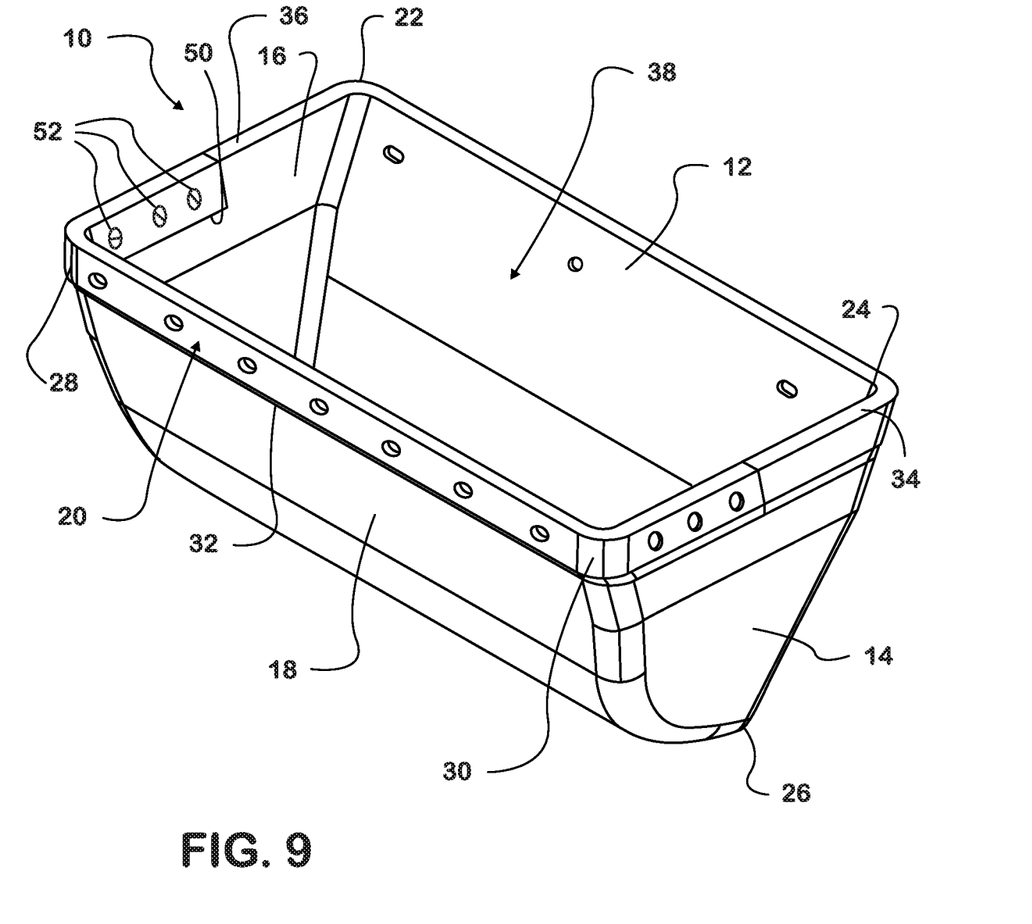
FIG. 9 illustrates a top perspective view of one embodiment of a material conveyor system container with a wear band removably attached with fasteners.

Turning to FIG. 9, one embodiment of the material conveyor system container is illustrated in a top perspective view. The wear band 20 is removably attached to the elevator bucket 10 with fasteners. The joint 50 is created when the wear band 20 is attached to the elevator bucket 10. The joint 50 is on the internal face of elevator bucket 10, and the internal face comprises the opposed sidewalls 14 and front wall 18. The granular material is discharged out of the elevator bucket 10 by tipping the elevator bucket 10 to pour the granular material onto a conveyor belt or into another container. The discharge of the granular material out of the elevator bucket 10 should be uninterrupted and any bumps, ripples or corrugations on the inside face of the elevator bucket 10 below at the joint 50 will disrupt the discharge of the granular material out of the elevator bucket 10 and prevent an effective discharge of the material. The joint 50 can be aligned with the internal face of the elevator bucket 10 to create one smooth surface so the joint 50 will not interrupt the flow of granular material out of the elevator bucket 10.

If fasteners are used to removably attach the wear band 20 to the lip 32, optional wear band through bores 44 (see FIG. 5) and optional lip through bores 48 (See FIG. 6) align when the wear band 20 is placed on the lip 32 (see FIG. 6), and provide a space for the fasteners to be inserted through the wear band 20 and the lip 32 of the elevator bucket 10. The internal face of the elevator bucket 10 can be smooth at the joint 50 of the wear band 20 and the elevator bucket 10. Fastener heads 52 can be sunk into the interior surface of the wear band 20 to create a smooth surface.

Referring to FIGS. 1, 2, 3, 4, 5, 6, 7, 8, and 9, the wear band 20 protects the lip 32 from wearing including that portion at its juncture with the top edges 34 and 36. As lip 32 wears away, the capacity of the elevator bucket 10 will become less as the combined bottom and front wall 18 wears away toward its juncture with wall segment 18a, thus reducing the volume of the space 38, FIG. 1, which is the working volume of the elevator bucket 10.

It has been discovered that, by attaching an abrasion resistant material, such as nylon or urethane to make a wear band, over a polymer used to make the non-wear band portions of the elevator bucket, the polymer being selected from materials indicated above, namely polyethylene or high density polyethylene, improves life of elevator buckets of the type described herein without increasing cost.

Fabrication of the elevator bucket 10 and related, nominally dimensioned buckets, as described herein, may be created with conventional polymer molding and overmolding methods, such as by injection molding, to provide a rugged, integral one-piece bucket with increased service life heretofore unappreciated in the art.

Other methods of attaching the abrasion resistant material (wear band 20) to the non-wear band portions of the elevator bucket 10 comprise with an interlocking system, such as a tongue and groove system, fasteners, adhesive, or a combination thereof. The wear band 20 can be permanently fixed to the elevator bucket 10 or it can be removably fixed to the elevator bucket 10, which would allow the wear band 20 to be replaced if it is worn away by the abrasive materials that are loaded into the elevator bucket 10.

Although preferred embodiments of the invention have been described in detail herein, those skilled in the art will recognize that various substitutions and modifications may be made without departing from the scope and spirit of the appended claims.

I claim:

1. A material conveyor system container comprising:
an elevator bucket having a back wall, opposed sidewalls, a bottom wall curving upward into a front wall spaced from the back wall, and a wear band;
the front wall being joined to the bottom wall to form an open top;
the front wall and bottom wall portions being joined to the opposed sidewalls by arcuate corner parts,
the wear band extending entirely across a top portion of the front wall and integral corner parts to protect the top portion of the front wall and integral corner parts from a flow of material wearing the elevator bucket; and
the wear band extending across a forward portion of a top portion of the opposed sidewalls, wherein the wear band is made of a highly abrasion resistant material and a remainder of the elevator bucket is made of a polyethylene material.

2. The material conveyor system container of claim 1, wherein the highly abrasion resistant material is nylon plastic.

3. The material conveyor system container of claim 1, wherein the polyethylene material is a high density polyethylene plastic.

4. The material conveyor system container of claim 1, wherein the highly abrasion resistant material is overmolded or ultrasonically welded onto the polyethylene material.

5. The material conveyor system container of claim 4, wherein the highly abrasion resistant material is overmolded or ultrasonically welded onto the polyethylene material to form a single homogenous elevator bucket.

6. The material conveyor system container of claim 5, wherein the highly abrasion resistant material is a different color than the polyethylene material.

7. The material conveyor system container of claim 1, wherein the highly abrasion resistant material is removably attached to the polyethylene material.

8. The material conveyor system container of claim 7, wherein the highly abrasion resistant material is removably attached to the polyethylene material with fasteners.

9. A material conveyor system container, comprising:
a single uniform body formed of two polymers, comprising:
a back wall, a pair of opposed sidewalls, a planar bottom wall forming a front wall and an upper opening made of a first polymer; and
a wear band made of a second polymer to protect the top portion of the front wall and integral corner parts from a flow of material wear the elevator bucket;
the wear band extending entirely across a top portion of the front wall and arcuate corner parts;

the wear band extends across a portion of a top edge of the pair of opposed sidewalls; and wherein the second polymer is overmolded onto the first polymer.

10. The material conveyor system container of claim 9, wherein the first polymer is thermoplastic polymer.

11. The material conveyor system container of claim 10, wherein the thermoplastic polymer is a high density polyethylene plastic.

12. The material conveyor system container of claim 9, wherein the second polymer is a highly abrasion resistant material.

13. The material conveyor system container of claim 12, wherein the abrasion resistant material is nylon plastic.

14. A method of manufacturing a material conveyor system container, comprising:

forming an elevator bucket comprising a lip, a back wall, opposed sidewalls; integral corner parts, and a front wall; wherein the front wall is joined to the back wall forming an open top, wherein the elevator bucket is made of a material comprising polyethylene;

forming a wear band, wherein the wear band is made of an abrasion resistant material to protect the top portion of the front wall and integral corner parts from a flow of material wearing the elevator bucket; and attaching the wear band to the lip of the bucket part, wherein the wear band extends entirely across a top portion of the front wall, arcuate corner parts, and extends across a portion of opposed sidewalls extending from the front wall towards the back wall.

15. The method of claim 14, wherein the abrasion resistant material is nylon plastic.

16. The method of claim 14, wherein the polyethylene material is high density polyethylene.

17. The method of claim 14, further comprising attaching the wear band to the elevator bucket with fasteners, adhesives, tongue and groove system, or a combination thereof.

18. The method of claim 14, wherein the attaching the wear band to the elevator bucket comprises overmolding the wear band onto the lip of the elevator bucket.

19. The method of claim 14, further comprising attaching the wear band to the elevator bucket with ultrasonic welding.

* * * * *